US011360342B2

(12) United States Patent
Nakata et al.

(10) Patent No.: US 11,360,342 B2
(45) Date of Patent: Jun. 14, 2022

(54) LIGHT-SCATTERING LIQUID CRYSTAL DEVICE

(71) Applicant: DIC Corporation, Tokyo (JP)

(72) Inventors: Hidetoshi Nakata, Kitaadachi-gun (JP); Keumhee Jang, Kitaadachi-gun (JP); Kazunori Maruyama, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/734,286

(22) PCT Filed: Jul. 23, 2019

(86) PCT No.: PCT/JP2019/028791
§ 371 (c)(1),
(2) Date: Dec. 2, 2020

(87) PCT Pub. No.: WO2020/022315
PCT Pub. Date: Jan. 30, 2020

(65) Prior Publication Data
US 2021/0223586 A1 Jul. 22, 2021

(30) Foreign Application Priority Data

Jul. 25, 2018 (JP) .............................. JP2018-139368

(51) Int. Cl.
*G02F 1/1334* (2006.01)
*C09D 4/00* (2006.01)
(Continued)

(52) U.S. Cl.
CPC ............. *G02F 1/1334* (2013.01); *C09D 4/00* (2013.01); *C09D 135/02* (2013.01);
(Continued)

(58) Field of Classification Search
CPC ......... G02F 1/133365; G02F 1/133788; G02F 1/133504; G02F 1/1334
See application file for complete search history.

(56) References Cited

U.S. PATENT DOCUMENTS 5,128,788 A * 7/1992 Takatoh ............ G02F 1/133711
428/1.2
5,304,323 A 4/1994 Arai et al.
(Continued)

FOREIGN PATENT DOCUMENTS

JP 3-4212 A 1/1991
JP 6-102493 A 4/1994
(Continued)

OTHER PUBLICATIONS

International Search Report dated Aug. 27, 2019, issued in counterpart International Application No. PCT/JP2019/028791 (2 pages).

*Primary Examiner* — Lucy P Chien
(74) *Attorney, Agent, or Firm* — WHDA, LLP

(57) ABSTRACT

The present invention relates to light-scattering liquid crystal devices suited for use in light control glass such as optical shutters and use in segment displays in, for example, clocks. A light-scattering liquid crystal device according to the present invention includes two substrates 1, of which at least one includes an electrode layer 2 and at least one is transparent, and a light control layer 4 held between the substrates, the light control layer 4 containing a liquid crystal material and a polymer substance, wherein the light-scattering liquid crystal device includes, between the substrates and the light control layer, a thin film layer 3 formed by subjecting a thermally curable compound containing a reactive group to thermal curing. According to the present invention, a light-scattering liquid crystal device having dramatically improved adhesion can be provided.

4 Claims, 1 Drawing Sheet

(51) Int. Cl.
*C09D 135/02* (2006.01)
*C09K 19/54* (2006.01)
*G02F 1/1343* (2006.01)
*G02F 1/137* (2006.01)
*G02F 1/1335* (2006.01)
*G02F 1/1333* (2006.01)
*G02F 1/1337* (2006.01)

(52) U.S. Cl.
CPC ............ *C09K 19/544* (2013.01); *G02F 1/137* (2013.01); *G02F 1/13439* (2013.01); *G02F 1/133365* (2013.01); *G02F 1/133504* (2013.01); *G02F 1/133788* (2013.01)

(56) References Cited

U.S. PATENT DOCUMENTS 5,953,089 A * 9/1999 Hiji ................... G02F 1/133504
349/112
2017/0199434 A1  7/2017 Hosaka et al.

FOREIGN PATENT DOCUMENTS

| JP | 8-286162 A | 11/1996 |
| JP | 2001-4986 A | 1/2001 |
| JP | 2016-69533 A | 5/2016 |
| WO | 2015/012368 A1 | 1/2015 |
| WO | 2015/199148 A1 | 12/2015 |

* cited by examiner

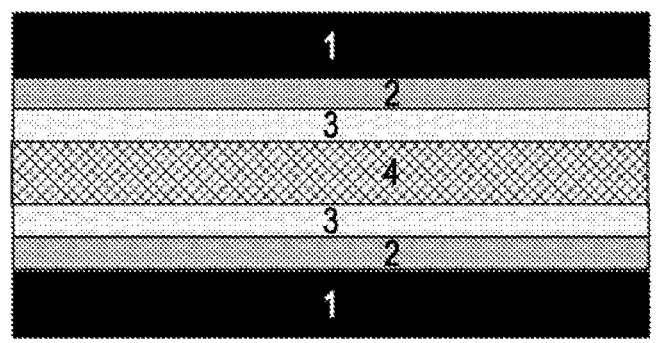

LIGHT-SCATTERING LIQUID CRYSTAL DEVICE

TECHNICAL FIELD

The present invention relates to light-scattering liquid crystal devices suited for use in light control glass such as optical shutters and use in segment displays in, for example, clocks.

BACKGROUND ART

Light-scattering liquid crystal devices, because of requiring no polarizers, have the benefit of being capable of achieving bright display compared with existing TN, STN, IPS, or VA mode liquid crystal display elements including polarizers and have a simple element structure. Thus, these light-scattering liquid crystal devices have been applied for use in optical shutters such as light control glass, use in various optical elements, and use in segment displays in, for example, clocks.

These light-scattering liquid crystal devices are in a mode where a polymer causes a change from a state in which the alignment of liquid crystal molecules are disturbed to a state in which the liquid crystal compound is unidirectionally aligned through voltage application to thereby control light scattering and transmission. Opaqueness is exhibited during scattering, and transparency is exhibited during transmission.

These light-scattering liquid crystal devices come in several kinds. For example, the type called NCAP, in which droplets of a liquid crystal substance are dispersed in a polymer (see PTL 1), is suited for larger areas, but exhibits a high driving voltage. As an approach to improving this, suggestions have been made towards, for example, the type called PDLC or PNLC, in which polymerization-induced phase separation caused by irradiating a mixture of a liquid crystal material and a photopolymerizable monomer with ultraviolet light, is used (PTL 2), and such a type has been applied to, for example, optical elements and display elements for which particularly a lower voltage is desired.

It has been desired that these devices be capable of operating in a wide temperature range. That is, it has been desired that these devices ensure display characteristics at a low temperature and operation during a thermal cycling test.

However, however, because of the weak adhesion between the polymer component in the liquid crystal and a substrate interface, the above-described polymer-dispersed liquid crystal is incapable of withstanding stress due to curing shrinkage caused by polymerization during polymerization-induced phase separation that occurs with ultraviolet light irradiation or due to thermal shrinkage occurring when the temperature of a produced light-scattering liquid crystal device is changed. As a result, a phenomenon in which a network structure is peeled off the substrate interface, resulting in the occurrence of a crack-like structure in a display, has often been seen, and thus a drastic deterioration of display performance has been exhibited.

In PTL 3 and PTL 4, silane coupling treatment on an ITO surface is disclosed as a technique of improving such adhesion. However, generally, the adhesion of a silane coupling agent to an ITO surface is not achieved without performing hydrophilic treatment on ITO, and the improving effect on adhesion is insufficient in the first place.

Generally, to improve the adhesion of a light control layer interface of a light-scattering liquid crystal device, a technique of enhancing the polarity of a polymer substance in the light control layer exists. However, in this case, an increase in driving voltage is caused.

CITATION LIST

Patent Literature

PTL 1: Japanese Unexamined Patent Application Publication No. 8-286162
PTL 2: U.S. Pat. No. 5,304,323
PTL 3: Japanese Unexamined Patent Application Publication No. 3-4212
PTL 4: Japanese Unexamined Patent Application Publication No. 2016-69533

SUMMARY OF INVENTION

Technical Problem

Thus, an object of the present invention is to provide a light-scattering liquid crystal device having dramatically improved adhesion.

Solution to Problem

As a result of intensive research in an effort to achieve the object described above, the present inventors have found that, in a light-scattering liquid crystal device, the adhesion between a light control layer and a substrate interface is remarkably improved by forming, between substrates and the light control layer, a thin film layer obtained by subjecting a thermally curable compound containing a reactive group to thermal curing or by subjecting an ionizing radiation-curable compound containing a reactive group to ionizing radiation curing, and have completed the present invention.

That is, the present invention relates to a light-scattering liquid crystal device including two substrates, of which at least one includes an electrode layer and at least one is transparent, and a light control layer held between the substrates, the light control layer containing a liquid crystal material and a polymer substance, wherein the light-scattering liquid crystal device includes, between the substrates and the light control layer, a thin film layer formed by subjecting a thermally curable compound containing a reactive group to thermal curing or by subjecting an ionizing radiation-curable compound containing a reactive group to ionizing radiation curing.

Advantageous Effects of Invention

According to the present invention, a light-scattering liquid crystal device having dramatically improved adhesion can be provided. Thus, the use of the light-scattering liquid crystal device according to the present invention contributes not only to excellent adhesion to a substrate and the prevention of peeling of a polymer network off the substrate due to curing shrinkage during polymerization-induced phase separation or due to thermal shrinkage caused by thermal history but also to the realization of excellent performance during a thermal cycling test.

Furthermore, the prevention of the increase in driving voltage is achieved, thereby enabling improved adhesion while retaining a low driving voltage.

BRIEF DESCRIPTION OF DRAWINGS

FIG. 1 is a schematic view of an example of the structure of a liquid crystal display element according to the present invention.

DESCRIPTION OF EMBODIMENTS

As described above, a light-scattering liquid crystal device according to the present invention includes two substrates, of which at least one includes an electrode layer and at least one is transparent, and a light control layer held between the substrates. The light-scattering liquid crystal device includes, between the substrates and the light control layer, a thin film layer (hereafter also referred to as a "polymer layer") formed by subjecting a thermally curable compound containing a reactive group to thermal curing or by subjecting an ionizing radiation-curable compound containing a reactive group to ionizing radiation curing.

Here, as described above, the light control layer contains a liquid crystal material and a polymer substance. Specifically, the structure is such that a composition for a light control layer containing, as essential components, a liquid crystal material and a polymerizable monomer is interposed between the two substrates, of which at least one includes an electrode layer and at least one is transparent (the thin film layer is disposed on the surface of at least one of the substrates, preferably both of the substrates, or, when an electrode is present, on the electrode), and that the curable composition of the mixture is partially or entirely cured with, for example, ultraviolet light, with the resultant polymerization-induced phase separation causing a liquid crystal layer to be interposed in the network structure of the polymer.

The specific structure will now be described in detail on the basis of FIG. 1. In FIG. 1, 1 denotes substrates, with at least one of the two substrates being transparent, and 2 denotes an electrode layer. Here, when IPS driving or FFS driving is performed, the structure may be such that the electrode layer 2 is formed only on one of the substrates. In FIG. 1, 3 denotes a thin film layer formed by subjecting a thermally curable compound containing a reactive group to thermal curing or by subjecting an ionizing radiation-curable compound containing a reactive group to ionizing radiation curing, and 4 denotes a light control layer such as a polymer-dispersed liquid crystal layer. Because this polymer layer 3 is present, the adhesion of a polymer network layer present in the light control layer 4 such as a polymer-dispersed liquid crystal layer to the base material is enhanced.

It is sufficient that only one of the substrates is transparent, and a glass substrate is suitably used. Other than a glass substrate, a plastic substrate such as that of PET (polyethylene terephthalate), PES (aromatic polyethersulfone), PMMA (acrylic resin), PC (polycarbonate), alicyclic polyolefin resin, cyclic olefin resin, PAR (polyarylate), or PEEK (aromatic polyether ketone) can be used. Furthermore, a nontransparent substrate such as a silicon substrate can be used as one substrate.

Electrode layers are generally disposed on the above-described substrates. The electrode layers are typically disposed on the two substrates, but when so-called lateral electric field driving such as IPS driving or FFS driving is performed, it is possible that an electrode is disposed only on one substrate. Examples of the electrode include transparent conductive films and transparent amorphous oxide semiconductor thin films, such as those of ITO, IZO, ZnO, and IGZO. As needed, surface modification may be performed on these films with, for example, glow discharge plasma or corona discharge plasma, and, for example, an alignment film or a photoalignment film, such as that of polyimide, or a $SiO_2$ or $SiN_X$ film may be formed on the electrode layers.

The thin film layers (polymer layers) 3 in FIG. 1 serve the function of connecting the substrates 1 including the electrode layers 2 and a polymer substance that forms a network structure present in the light control layer 4 such as a polymer-dispersed liquid crystal layer. As described above, the polymer layers 3 are obtained by subjecting a thermally curable compound to thermal polymerization or by subjecting an ionizing radiation-curable compound to ionizing radiation polymerization. Particularly, a thermally polymerized thin film has excellent adhesion to the substrate, and thus the adhesion between the polymer layer and the base material is further enhanced. The thickness of the thin film is preferably small in view of the polymer-dispersed liquid crystal performing voltage driving. Thus, the thin film is preferably formed with a thickness of 10 nm to 1000 nm, more preferably formed with a thickness of 20 nm to 500 nm, and even more preferably formed with a thickness of 30 nm to 200 nm.

Here, a thermally curable or ionizing radiation-curable compound containing a reactive group, which forms the thin film layer (e.g., the polymer layers 3 in FIG. 1), preferably contains a thermally curable or ionizing radiation-curable compound containing a reactive group represented by, for example, Formulas (P-1) to (P-21) below.

[Chem. 1]

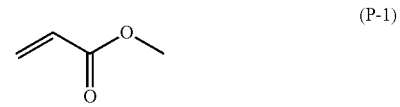
(P-1)

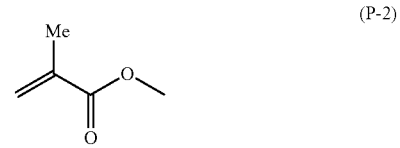
(P-2)

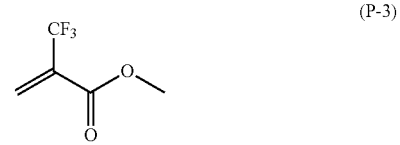
(P-3)

(P-4)

(P-5)

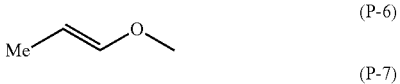
(P-6)

(P-7)

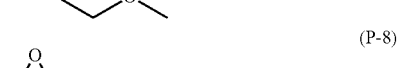
(P-8)

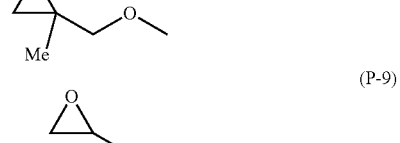
(P-9)

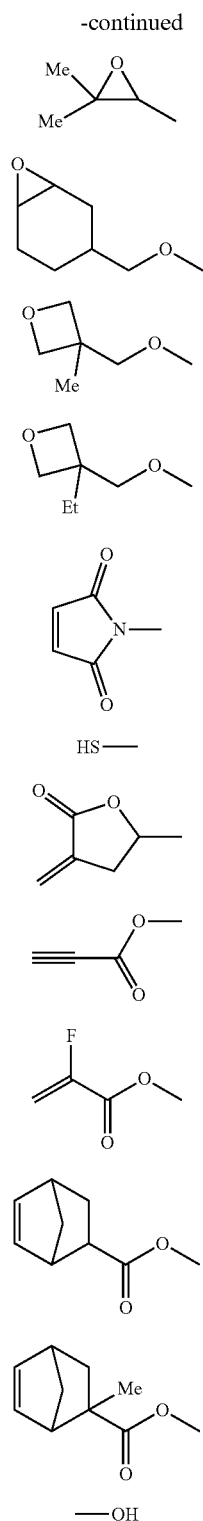

As the thermally curable or ionizing radiation-curable compound containing a reactive group represented by Formulas (P-1) to (P-21) above, specifically, preferable is an acrylic monomer containing a reactive group represented by (P-1) to (P-3), an allyl ether monomer containing a reactive group represented by (P-4), for example, diallyl ether, bisphenol A diallyl ether, bisphenol A diallyl ether, or polyallyl ether of novolac resin, an epoxy compound containing (P-7) to (P-10) as a reactive group, for example, bisphenol A epoxy resin, bisphenol F epoxy resin, or novolac epoxy resin, 3,4-epoxycyclohexylmethyl methacrylate, which contains (P-11) as a reactive group, an oxetane compound containing (P-12) or (P-13) as a reactive group, for example, ethyl-3-hydroxymethyloxetane (OXA) or 3-ethyl-3-chrolomethyloxetane (OXC), or a maleimide compound containing (P-14) as a reactive group, for example, maleimide ethyl acetate or polyalkylene ether bismaleimide. However, in the present invention, particularly an acrylic monomer containing a reactive group represented by (P-1) or (P-2) is preferable in view of the improving effect on adhesion.

Examples of the acrylic monomer include, specifically, trimethylolpropane tri(meth)acrylate, EO-modified trimethylolpropane tri(meth)acrylate, isocyanuric acid EO-modified tri(meth)acrylate, pentaerythritol tri(meth)acrylate, pentaerythritol tetra(meth)acrylate, ditrimethylolpropane tetra(meth)acrylate, dipentaerythritol penta(meth)acrylate, and dipentaerythritol hexa(meth)acrylate, and examples other than the foregoing include polyfunctional urethane oligomers, polyester acrylates, and epoxy acrylates.

Among the above-described thermally curable or ionizing radiation-curable compounds containing a reactive group, it is more preferable to contain a compound containing three or more reactive groups, and it is even more preferable to contain a compound containing four or more reactive groups, in view of excellence in the improving effect on adhesion and in thermal cycling resistance.

Furthermore, the above-described thermally curable or ionizing radiation-curable compound may be used alone or as a thermally curable or an ionizing radiation-curable composition containing two or more kinds of the foregoing in combination. The thermally curable or ionizing radiation-curable compound preferably contains a hydrophilic group, such as a hydroxy group, in the molecular structure in view of making the improving effect on adhesion and thermal cycling resistance remarkable, and it is particularly preferable that the compound be particularly used as a mixture that contains a compound having a reactivity of four or more and that contains a compound containing a hydrophilic group in a proportion of 40% to 80% by mass.

A polymerization initiator may be added as needed. As a thermal polymerization initiator, a publicly known and commonly used thermal polymerization initiator can be used, and usable examples include organic peroxides such as methyl acetoacetate peroxide, cumene hydroperoxide, benzoyl peroxide, bis(4-t-butylcyclohexyl) peroxydicarbonate, t-butyl peroxybenzoate, methyl ethyl ketone peroxide, 1,1-bis(t-hexylperoxy)3,3,5-trimethylcyclohexane, p-pentahydroperoxide, t-butylhydroperoxide, dicumyl peroxide, isobutyl peroxide, di(3-methyl-3-methoxybutyl) peroxydicarbonate, and 1,1-bis(t-butylperoxy)cyclohexane; azonitrile compounds such as 2,2'-azobisisobutyronitrile and 2,2'-azobis(2,4-dimethylvaleronitrile); azoamidine compounds such as 2,2'-azobis(2-methyl-N-phenylpropion-amidine) dihydrochloride; azoamide compounds such as 2,2'-azobis[2-methyl-N-[1,1-bis(hydroxymethyl)-2-hydroxyethyl]propionamide]; and alkylazo compounds such as 2,2'-azobis(2,4,4-trimethylpentane). Specific examples include "V-40" and "VF-096" manufactured by Wako Pure Chemical Industries, Ltd. and "PERHEXYL D" and "PERHEXYL I" manufactured by Nippon Oil and Fats Co., Ltd. (currently NOF Corporation).

As a photopolymerization initiator, examples include "IRGACURE 651", "IRGACURE 184", "DAROCUR 1173", "IRGACURE 907", "IRGACURE 127", "IRGA- CURE 369", "IRGACURE 379", "IRGACURE 819", "IRGACURE 2959", "IRGACURE 1800" "IRGACURE 250", "IRGACURE 754", "IRGACURE 784", "IRGACURE OXE 01", "IRGACURE OXE 02", "IRGACURE OXE 04", "LUCIRIN TPO", "DAROCUR 1173", and "DAROCUR MBF" manufactured by BASF SE; "ESACURE 1001 M", "ESACURE KIP 150", "SPEEDCURE BEM" "SPEEDCURE BMS", "SPEEDCURE MBP", "SPEEDCURE PBZ", "SPEEDCURE ITX", "SPEEDCURE DETX", "SPEEDCURE EBD", "SPEEDCURE MBB", and "SPEEDCURE BP" manufactured by Lambson, Ltd.; "KAYACURE DMBI" manufactured by Nippon Kayaku Co., Ltd.; "TAZ-A" manufactured by Nihon Siber-Hegner K.K. (currently DKSH K.K.); "ADEKA OPTOMER SP-152", "ADEKA OPTOMER SP-170", "ADEKA OPTOMER N-1414", "ADEKA OPTOMER N-1606", "ADEKA OPTOMER N-1717", and "ADEKA OPTOMER N-1919" manufactured by ADEKA Corporation; "CYRACURE UVI-6990", "CYRACURE UVI-6974", and "CYRACURE UVI-6992" manufactured by UCC; "ADEKA OPTOMER SP-150, SP-152, SP-170, and SP-172" manufactured by Asahi Denka Kogyo K.K.; "PHOTOINITIATOR 2074" manufactured by Rhodia SA; "IRGACURE 250" manufactured by BASF SE; "UV-9380C" manufactured by GE Silicones, LLC; and "DTS-102" manufactured by Midori Kagaku Co., Ltd.

When cationic polymerization is performed, examples include sulfonium salts such as UVACURE 1590 (manufactured by Daicel-Cytec Co., Ltd.) and CPI-110P (manufactured by San-Apro, Ltd.) and iodonium salts such as IRGACURE 250 (manufactured by Ciba Specialty Chemicals, Inc.), WPI-113 (manufactured by Wako Pure Chemical Industries, Ltd.), and Rp-2074 (Rhodia Japan, Ltd.).

When electron beam curing is performed, the polymerization initiator may be present or absent.

The amount of the polymerization initiator used is preferably 0.1 to 10 parts by mass and particularly preferably 0.5 to 5 parts by mass with respect to the polymerizable compound. The polymerization initiator can be used alone or in a mixture of two or more kinds. As needed, for example, a sensitizer may also be used.

As the method for coating the base material with the compound, it is possible to perform a publicly known and commonly used method, such as an applicator method, a bar coating method, a spin coating method, a roll coating method, a direct gravure coating method, a reverse gravure coating method, a flexo coating method, an inkjet method, a die coating method, a cap coating method, a dip coating method, or a slit coating method. To perform coating, the compound can be diluted with, for example, an organic solvent. The organic solvent used is not particularly limited, but is preferably an organic solvent in which the compound exhibits good solubility and is preferably an organic solvent capable of being dried at a temperature of 100° C. or less. Examples of the organic solvent include aromatic hydrocarbons such as toluene, xylene, cumene, and mesitylene; ester solvents such as methyl acetate, ethyl acetate, propyl acetate, and butyl acetate; ketone solvents such as methyl ethyl ketone (MEK), methyl isobutyl ketone (MIBK), cyclohexanone, and cyclopentanone; ether solvents such as tetrahydrofuran, 1,2-dimethoxyethane, and anisole; amide solvents such as N,N-dimethylformamide and N-methyl-2-pyrrolidone; alcohol solvents such as methyl alcohol, ethyl alcohol, and isopropyl alcohol; propylene glycol monomethyl ether acetate; diethylene glycol monomethyl ether acetate; γ-butyrolactone; and chlorobenzene. These can be used alone or in a mixture of two or more kinds.

The thin film of the monomer formed by the above-described methods can be cured by thermal polymerization or ionizing radiation polymerization. When polymerization is performed by ionizing radiation, polymerization is preferably performed under nitrogen purging or in a vacuum to reduce the impact of oxygen inhibition. Furthermore, curing can be performed with an electron beam. As the curing method, a thin film formed by thermal polymerization has particularly excellent adhesion to the substrate. Furthermore, a thin film polymerized in the absence of a polymerization initiator, because of having a low rate of polymerization, is less prone to curing shrinkage and interacts with the substrate for a long time while being in a high-temperature state. As a result, for example, the penetration of the thin film into the substrate proceeds, thereby enabling further excellent adhesion. Thus, a thin film having high adhesion to a base material is formed. The temperature at which thermal polymerization is performed varies depending on the base material used but is preferably 80° C. to 350° C., more preferably 100° C. to 300° C., and even more preferably 200° C. to 250° C.

With heating or ionizing radiation, groups represented by (P-1) to (P-21) react with one another to cause a polymerization reaction, but some groups remain unpolymerized. When these unpolymerized groups are bonded to the polymer network layer present in the below-described light control layer 4 in FIG. 1 such as a polymer-dispersed liquid crystal layer, the adhesion between the light control layer and the substrate can be achieved. Thus, the reactive group of the compound used for the polymer layers 3 in FIG. 1 is preferably a compound that reacts with the reactive group used in the compound forming the polymer network layer present in the light control layer 4 in FIG. 1 such as a polymer-dispersed liquid crystal layer, and particularly preferably a group that is ultraviolet light-reactive.

Because the polymer layers 3 in FIG. 1 exhibit higher adhesion to the substrate in the case of thermal polymerization, a substrate capable of withstanding thermal polymerization can be employed, and the kind of substrate does not particularly matter, unlike the case of a silane coupling agent, which is capable of exhibiting its usefulness only to a substrate having a specific functional group. Furthermore, in the case of ionizing radiation polymerization, it is sufficient that the substrate is capable of withstanding ionizing radiation irradiation, and no specific functional group is needed.

The light control layer 4 in FIG. 1, which is a polymer-dispersed liquid crystal layer, contains, as essential components, a liquid crystal composition and a polymer substance that forms a network structure in the light control layer.

The liquid crystal composition is preferably a composition of one kind or two or more kinds of liquid crystal compounds represented by General Formula (I)

[Chem. 2]

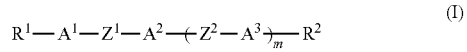

(wherein $R^1$ represents an alkyl group having 1 to 10 carbon atoms in which one or two non-adjacent $CH_2$ groups may be substituted with an oxygen atom, —COO—, or —OCO— and one or more methylene groups may be substituted with —CH=CH— or —CH=CH—, and $R^1$ is preferably an alkyl group having 1 to 5 carbon atoms (in which one or more methylene groups may be substituted with —CH=CH—);

$R^2$ represents a fluorine atom, a chlorine atom, a cyano group, a $CF_3$ group, an $OCF_3$ group, an $OCHF_2$ group, a NCS group, or an alkyl group having 1 to 10 carbon atoms in which one or two non-adjacent $CH_2$ groups may be substituted with an oxygen atom, —COO—, or —OCO— and one or more methylene groups may be substituted with —CH=CH— or —CH=CH—, and $R^2$ is preferably a fluorine atom, a cyano group, or an alkyl group having 1 to 5 carbon atoms (in which one or two non-adjacent $CH_2$ groups may be substituted with an oxygen atom);

$Z^1$ and $Z^2$ each independently represent a single bond, —COO—, —OCO—, —$CH_2$—$CH_2$—, —CH=CH—, —$CF_2O$—, —OCF—, or —C≡C—, wherein when a plurality of $Z^2$ are present, they may be the same or different, and $Z^1$ and $Z^2$ are preferably each independently a single bond, —COO—, —$CF_2O$—, or —C≡C— (wherein when a plurality of $Z^2$ are present, they may be the same or different);

$A^1$, $A^2$, and $A^3$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, or a 2,6-naphthylene group, wherein the 1,4-phenylene group, the 1,2,3,4-tetrahydronaphthalene-2,6-diyl group, and the 2,6-naphthylene group may be unsubstituted or have one or two or more fluorine atoms, chlorine atoms, $CF_3$ groups, $OCF_3$ groups, or $CH_3$ groups as substituents, and when a plurality of $A^3$ are present, they may be the same or different, and $A^1$, $A^2$, and $A^3$ are preferably each independently a 1,4-phenylene group, a pyrimidine-2,5-diyl group, a 1,4-cyclohexylene group, or a 2,6-naphthylene group (wherein the 1,4-phenylene group and the 2,6-naphthylene group may be unsubstituted or have one or two or more fluorine atoms or $CH_3$ groups as substituents, and when a plurality of $A^3$ are present, they may be the same or different); and m is 0, 1, or 2), and more preferably a liquid crystal composition that exhibits a nematic phase.

Because the light-scattering liquid crystal device according to the present invention is a light-scattering liquid crystal element, the Δn (refractive index anisotropy) of the liquid crystal composition used is preferably high. Thus, a compound in which two or more of $A^1$, $A_2$, and $A^3$ are 1,4-phenylene groups, pyridine-2,5-diyl groups, or 2,6-naphthylene groups (wherein the 1,4-phenylene groups and the 2,6-naphthylene groups may have one or two or more fluorine atoms, chlorine atoms, $CF_3$ groups, $OCF_3$ groups, or $CH_3$ groups as substituents) is preferably contained in the liquid crystal composition in an amount of 50% by mass or more, more preferably contained in an amount of 70% by mass or more, and even more preferably contained in an amount of 85% by mass or more. In view of the same, $Z^1$ and $Z^2$ preferably represent a single bond, —COO—, —OCO—, or —C≡C—, and when light fastness is focused on, a compound in which $Z^1$ and $Z^2$ are a single bond, —COO—, or —OCO— is preferably contained in the liquid crystal composition in an amount of 50% by mass or more, more preferably contained in an amount of 70% by mass or more, and even more preferably contained in an amount of 85% by mass or more. When higher scattering properties are focused on, a compound in which $Z^1$ or $Z^2$ is —C≡C— is preferably contained in an amount of 40% by mass or more, more preferably contained in an amount of 50% by mass or more, and even more preferably contained in an amount of 60% by mass or more. When even higher scattering properties are desired, a compound in which $A^1$, $A^2$, and $A^3$ are 1,4-phenylene groups, $Z^1$ and $Z^2$ are single bonds, and $R^2$ is a cyano group is preferably contained in an amount of 5% or more, and more preferably, at least one of the 1,4-phenylene groups of $A^1$, $A^2$, and $A^3$ has at least one substituent.

The polymer substance that forms a network structure in the light control layer is obtained by polymerizing a polymerizable monomer in the composition for a light control layer. The polymerizable monomer is preferably a compound cured with heat or ultraviolet light and is preferably an ultraviolet light-curable polymerizable monomer. Examples of the ultraviolet light-curable polymerizable monomer include radical polymerization, cationic polymerization, and anionic polymerization, but a radically polymerizable compound is preferable, and particularly, an acrylic or a methacrylic polymerizable compound is more preferable. Examples of the acrylic or methacrylic polymerizable compound include monofunctional polymerizable compounds and polyfunctional polymerizable compounds, but the polymer substance is preferably formed from at least one kind or more of polyfunctional polymerizable compounds and more preferably formed from at least one kind or more of bifunctional polymerizable compounds. Even more preferably, the polymer substance is formed from a combination of a bifunctional polymerizable compound and a monofunctional polymerizable compound.

The bifunctional polymerizable compound is not particularly limited, but is preferably General Formula (II-1)

[Chem. 3]

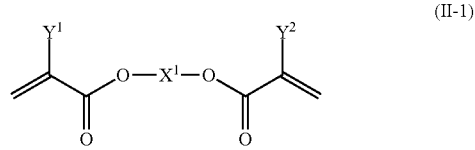

(II-1)

(wherein $Y^1$ and $Y^2$ represent a hydrogen atom or a methyl group and $X^1$ represents a divalent organic group). The molecular weight of $X^1$, which is a divalent organic group, is preferably 150 to 15000 and more preferably 350 to 10000. Even more preferably, $X^1$ is a group having a carbon atom, an oxygen atom, a nitrogen atom, and a hydrogen atom and still even more preferably, $X^1$ contains no benzene rings. Particularly when adhesion is most focused on, $X^1$ is General Formula (II-1-1)

[Chem. 4]

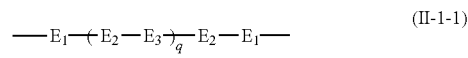

(II-1-1)

(wherein $E^1$ represents an alkyl group having 1 to 4 carbon atoms in which one or more —$CH_2$— may be substituted with an oxygen atom, —CO—, —COO—, or —OCO—, q represents 1 to 20, $E^2$ represents (II-1-2) to (II-1-5) below

[Chem. 5]

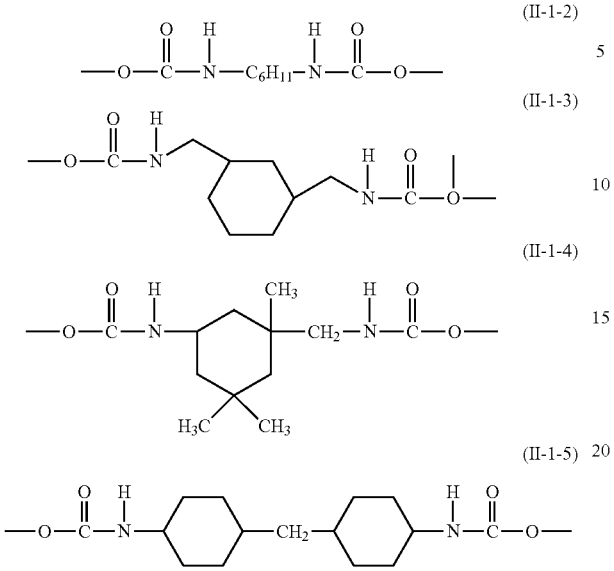

(II-1-2)
(II-1-3)
(II-1-4)
(II-1-5)

and $E^3$ is preferably (II-1-6) or (II-1-10) below

[Chem. 6]

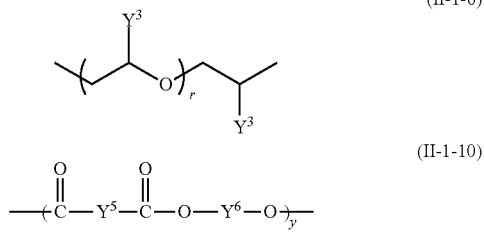

(II-1-6)
(II-1-10)

wherein $Y^3$ represents a hydrogen atom or a methyl group, $Y^5$ represents a divalent aromatic group, a divalent alicyclic hydrocarbon group, or an alkylene group having 1 to 14 carbon atoms in which the alkylene may be substituted with an oxygen atom or a —CO— group, $Y^6$ represents an alkylene group having 1 to 14 carbon atoms in which the alkylene may be substituted with an oxygen atom or a —CO— group, and r and y represent 10 to 300).

When driving voltage is focused on, $X^1$ is preferably a compound represented by General Formulas (II-1-7) to (II-1-9)

[Chem. 7]

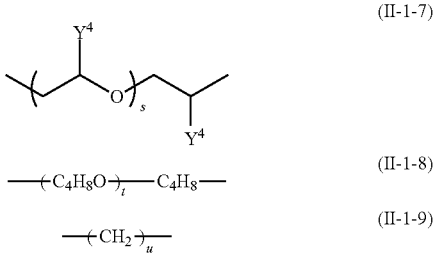

(II-1-7)
(II-1-8)
(II-1-9)

(wherein $Y^4$ represents a hydrogen atom or a methyl group, s and t represent an integer of 2 to 15, u represents an integer of 6 to 40, one or more $CH_2$ groups in Formula (II-1-9) may be substituted with an oxygen atom, —CO—, —NH—, —COO—, or —OCO—, provided that no oxygen atoms are directly bonded to one another, and one or two hydrogen atoms in the $CH_2$ groups may be substituted with a methyl or an ethyl group).

The monofunctional compound is not particularly limited, but is preferably General Formula (II-2)

[Chem. 8]

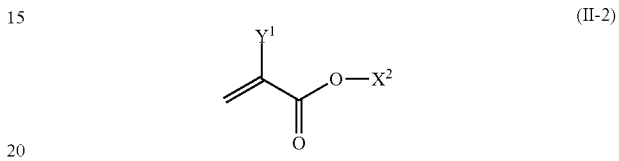

(II-2)

(wherein $Y^1$ represents a hydrogen atom or a methyl group and $X^2$ represents a monovalent organic group). The molecular weight of $X^2$, which is a monovalent organic group, is preferably 120 to 1000 and more preferably 150 to 500. Even more preferably, $X^2$ is a group having a carbon atom, an oxygen atom, and a hydrogen atom, and still even more preferably, $X^2$ contains no benzene rings. Further preferably, $X^1$ is an optionally branched alkyl group having 8 to 30 carbon atoms (in which one or two or more non-adjacent —$CH_2$— may each independently be substituted with an oxygen atom, —COO—, or —OCO—), more preferably an optionally branched alkyl group having 10 to 25 carbon atoms (in which one or two or more non-adjacent —$CH_2$— may each independently be substituted with an oxygen atom, —COO—, or —OCO—), and even more preferably a branched alkyl group having 16 to 24 carbon atoms.

When the polymer substance that forms a network structure in the light control layer is formed by ultraviolet light polymerization, using a photopolymerization initiator is preferable. The photopolymerization initiator is not particularly limited, but is preferably an alkylphenone, acylphosphine oxide, an oxime ester, or such another intramolecular cleavage photopolymerization initiator. Specific examples include diphenyl-(2,4,6-trimethylbenzoyl)phosphine oxide; 2,2-dimethoxy-1,2-diphenylethan-1-one; 1-hydroxy-cyclohexyl-phenyl-ketone; 2-hydroxy-2-methyl-1-phenyl-propan-1-one; benzophenone; 1-[4-(2-hydroxyethoxy)-phenyl]-2-hydroxy-2-methyl-1-propan-1-one; 2-hydroxy-1-[4-[4-2-hydroxy-2-methyl-propionyl)-benzyl]-phenyl]-2-methyl-propan-1-one; phenylglyoxylic acid methyl ester; 2-methyl-1-[4-(methylthio)phenyl]-2-morpholinopropan-1-one; 2-benzyl-2-dimethylamino-1-(4-morpholinophenyl)-butanone-1; 2-dimethylamino-2-(4-methyl-benzyl)-1-(4-morpholin-4-yl-phenyl)-butan-1-one; bis(2,4,6-trimethylbenzoyl)-phenylphosphine oxide; bis(2,4,6-trimethylbenzoyl)-phenylphosphine oxide; 1,2-octanedione, 1-[4-(phenylthio)-, 2-(O-benzoyloxime)]; ethanone, 1-[9-ethyl-6-(2-methylbenzoyl)-9H-carbazol-3-yl]-, 1-(O-acetyloxime); benzophenone; methyl benzoylformate; oligo(2-hydroxy-2-methyl-1-[4-(1-methylvinyl)phenyl]propanone; 2,4,6-trimethylbenzophenone; 4-methylbenzophenone; 2-ethoxy-1,2-diphenylethan-1-one; 2-(1-methylethoxy)-1,2-diphenylethan-1-one; and 2-isobutoxy-2-phenylacetophenone.

Among these, particularly 2,2-dimethoxy-1,2-diphenylethan-1-one and 2-hydroxy-2-methyl-1-phenyl-propan-1-one are more preferable.

As with well-known liquid crystal devices, a spacer for spacing purposes can be interposed between the two substrates. The thickness between the substrates, that is, the thickness of the light control layer, is preferably 2 µm to 50 µm and more preferably 5 µm to 40 µm. Because the present invention is more effective particularly when the thickness between the substrates is large, the thickness of the light control layer is even more preferably 10 µm to 30 µm and most preferably 14 µm to 25 µm.

Other than the foregoing, as needed, for example, antioxidants, ultraviolet light absorbers, non-reactive oligomers, inorganic fillers, organic fillers, polymerization inhibitors, defoamers, leveling agents, plasticizers, and silane coupling agents may be appropriately added.

Next, a method for producing the light-scattering liquid crystal device according to the present invention will be described. The light-scattering liquid crystal device according to the present invention can be obtained by interposing a composition for a light control layer between two substrates including an electrode, of which at least one is a transparent substrate including a transparent electrode, and thereafter polymerizing a polymerizable monomer with heat or active energy beam irradiation to cause phase separation from a liquid crystal composition and to thereby form a light control layer containing, as essential components, the liquid crystal composition and a network-like polymer substance.

For the two substrates, a transparent material having flexibility, such as glass or plastic, can be used, and one of the substrates may be of a nontransparent material such as silicon. A transparent substrate including a transparent electrode layer can be obtained by, for example, depositing indium tin oxide (ITO) on a transparent substrate such as a glass substrate by sputtering. Using a low-wavelength-dispersion transparent substrate is more preferable because it contributes to the enhancement of the light-scattering power of the device according to the present invention and thus contributes to the enhancement of reflectance and contrast. Examples of the low-wavelength-dispersion transparent substrate include borosilicate glass, plastic transparent films such as those of polyethylene terephthalate and polycarbonate, and transparent substrates coated with a dielectric multilayer film using an optical interference condition of ¼λ.

Furthermore, as needed, a polymer film, an alignment film, a $SiO_2$ film, a $SiN_x$ film, or a color filter can be disposed on the substrates. As the alignment film, for example, a polyimide alignment film or photoalignment film can be used. As the method for forming an alignment film, for example, a polyimide alignment film can be obtained by coating the transparent substrate with a polyimide resin composition, performing thermal curing at a temperature of 180° C. or more, and performing a rubbing process with a cotton cloth or a rayon cloth. Furthermore, a polymer film, such as a polyimide film, that has not been subjected to a rubbing process, can be used.

The color filter can be produced by, for example, a pigment dispersion method, a printing method, an electrodeposition method, or a dyeing method. A method for producing a color filter by a pigment dispersion method will be described by way of example. A curable coloring composition for a color filter is applied to the transparent substrate, is subjected to a patterning process, and is cured by heating or light irradiation. These steps can be performed for each of the three colors, namely, red, green, and blue, to thereby produce a pixel portion for a color filter. Other than the foregoing, a pixel electrode including an active element such as a TFT, a thin-film diode, or a metal-insulator-metal resistivity element may be disposed on the substrate.

Furthermore, thermally cured thin films according to the present invention are formed on the substrates. As for the thermal polymerization temperature, which is as described above, polyimide firing conditions in an LCD production line can be applied as they are.

The substrates are positioned opposite one another such that the thermally cured thin films are on the inside. Here, the space between the substrates may be adjusted via a spacer. In such a case, the adjustment is preferably made such that the obtained light control layer has a thickness of 1 µm to 100 µm. Particularly, the thickness is preferably 2 µm to 50 µm, more preferably 2 µm to 30 µm, even more preferably 5 µm to 25 µm, and most preferably 10 µm to 20 µm. Examples of the spacer include glass particles, plastic particles, alumina particles, and photoresist materials. Subsequently, a sealant such as an epoxy thermally curable composition is screen-printed on the substrates with a liquid crystal inlet disposed therebetween, the substrates are bonded together, and the sealant is thermally cured by heating.

The method for interposing a material forming a light control layer between the two substrates may be a common vacuum injection method, but may be performed by dripping or coating such as an ODF method. During the time from the vacuum injection, dripping, or coating step until ultraviolet light polymerization is performed to form a network structure in the light control layer, the material forming a light control layer is preferably in a uniform isotropic state.

As the lamp for performing ultraviolet light polymerization, for example, a metal-halide lamp, a high-pressure mercury lamp, or a super-high-pressure mercury lamp can be used. As the wavelength of the ultraviolet light with which irradiation is performed, ultraviolet light in a wavelength range which is the absorption wavelength range of the photopolymerization initiator contained in the material forming a light control layer and which is not the absorption wavelength range of the liquid crystal composition contained in the material is preferable. Specifically, it is preferable to use a metal-halide lamp, a high-pressure mercury lamp, or a super-high-pressure mercury lamp, with ultraviolet light at 330 nm or less being cut off. Furthermore, it is preferable to use an UV-LED lamp with which irradiation at a single wavelength can be performed.

The temperature during ultraviolet light irradiation is an important factor for determining the characteristics of the light control layer and is preferably a temperature slightly above the isotropic-nematic transition point of the polymer-dispersed liquid crystal composition. Specifically, 0.1° C. to 3.0° C. above the transition point is preferable.

During this ultraviolet light polymerization, the reactive groups remaining in the polymer layers 3 in FIG. 1 react with the polymerizable compound that forms a network structure, the polymerizable compound being contained in the material forming a light control layer, thereby enabling strong adhesion.

The temperature during ultraviolet light irradiation is an important factor for determining the characteristics of the light control layer and is preferably a temperature slightly above the isotropic-nematic transition point of the composition for a light-scattering liquid crystal device. Specifically, 0.1° C. to 10° C. above the transition point is preferable, and 0.1° C. to 3° C. above the transition point is more preferable.

The light control layer in the light-scattering liquid crystal device produced by the above-described techniques or by a technique other than these has, for example, a structure in which the liquid crystal composition is confined in capsule form with the polymer substance, a structure in which a three-dimensional network structure of the transparent polymer substance is formed in a continuous phase of the liquid crystal composition, or a structure in which both of these structures are mixed, but preferably has a structure in which a three-dimensional network structure of the transparent polymer substance is formed in a continuous phase of the liquid crystal composition and more preferably has a structure in which a three-dimensional network structure of the polymer substance is formed in a continuous phase of the liquid crystal composition by ultraviolet light irradiation.

The average gap spacing of the network structure largely impacts the characteristics of the light-scattering liquid crystal device, and the average gap spacing is preferably 0.2 µm to 2 µm, more preferably 0.2 µm to 1 µm, and most preferably 0.3 µm to 0.7 µm.

The light-scattering liquid crystal device according to the present invention is characterized by a small driving voltage at a low temperature, and V90 at a cell thickness of 5 µm is preferably 7.5 V or less and more preferably 6.5 V or less.

On the back side of the light-scattering liquid crystal device according to the present invention, for example, a light-absorbing layer or a diffuse reflector can be disposed to thereby obtain a reflective light-scattering liquid crystal device having high reflectance and contrast. When light-absorbing layers having different light absorption wavelengths such as those corresponding to cyan, magenta, and yellow are disposed such that they match the positions of pixel electrodes for their respective colors, color display is enabled. Furthermore, functions such as specular reflection, diffuse reflection, retroreflection, and holographic reflection can be added.

EXAMPLES

Hereafter, the present invention will be described in further detail with reference to Examples, but these Examples are not intended to limit the present invention. "%" pertaining to the compositions of the Examples and Comparative Examples below refers to "% by mass".

Examples 1 to 16, Comparative Examples 1 and 2

ITO-deposited glass substrates were spin-coated, at a rotation speed of 1000 rpm for 15 seconds, with 3% by mass solutions of various acrylic monomers presented in Table 1 in isopropyl alcohol. The substrates were thereafter heated at 230° C. for 30 minutes to thereby subject the acrylic monomers to thermal curing while removing the solvent. The thickness of the cured films, which was measured with a Dektak stylus profiling system (manufactured by Bruker Corporation), was 50 nm to 200 nm. After the substrates having the thin films formed thereon were spin-coated, at a rotation speed of 2000 rpm for 20 sec, with acrylic monomer compositions presented in Table 2 which are materials for forming a polymer substance that forms a network structure in the light control layer, irradiation with ultraviolet light at 50 mW/cm$^2$ was performed using a super-high-pressure mercury lamp for 30 seconds under nitrogen purging to thereby form polymer film layers on the substrates having the thin films formed thereon. The results of a cross-cut test (JIS K5400) performed on the polymer film layers are presented in Table 3. The number of squares remaining among 100 squares was recorded in the cross-cut test.

TABLE 1

| Compound No. | Compound name | Structural formula | |
|---|---|---|---|
| M1 | Polyethylene glycol diacrylate | | |
| M2 | Trimethylolpropane triacrylate | | |
| M3 | Pentaerythritol tri- and tetra-acrylate | | R3 = OH 55-63% |
| M4 | Pentaerythritol tri- and tetra-acrylate | | R3 = OH 10% or less |

TABLE 1-continued

| Compound No. | Compound name | Structural formula | |
|---|---|---|---|
| M5 | Dipentaerythritol penta- and hexa-acrylate | [structure shown] | R4 = OH 50-60% |
| M6 | Dipentaerythritol penta- and hexa-acrylate | | R4 = OH 10-20% |
| M7 | Acrylic acid ester of dipentaerythritol caprolactone | [structure shown] | |
| M8 | Hexafunctional urethane acrylate | UA-100H (Shin-Nakamura Chemical Co., Ltd.) | |

TABLE 2

| Monomer composition | MA | MB |
|---|---|---|
| [structure with $m_1 + m_2 \approx 2$] | 78% | |
| [structure with $m_3 \approx 7$] | 73% | |
| [branched acrylate structures] | 20% | |
| [long-chain alkyl acrylate] | 25% | |
| [benzophenone-type photoinitiator with OCH$_3$ groups] | 2% | 2% |

TABLE 3

| | Polymer layer 3 | Polymer layer used in light control layer 4 | Cross-cut test |
|---|---|---|---|
| Comparative Example 1 | None | MA | 0 |
| Example 1 | M1 | MA | 5 |
| Example 2 | M2 | MA | 23 |
| Example 3 | M3 | MA | 100 |
| Example 4 | M4 | MA | 72 |
| Example 5 | M5 | MA | 100 |
| Example 6 | M6 | MA | 65 |
| Example 7 | M7 | MA | 95 |
| Example 8 | M8 | MA | 99 |
| Comparative Example 2 | None | MB | 0 |
| Example 9 | M1 | MB | 6 |
| Example 10 | M2 | MB | 42 |
| Example 11 | M3 | MB | 100 |
| Example 12 | M4 | MB | 80 |
| Example 13 | M5 | MB | 100 |
| Example 14 | M6 | MB | 69 |
| Example 15 | M7 | MB | 82 |
| Example 16 | M8 | MB | 93 |

Comparative Examples 3 and 4

ITO substrates were spin-coated, at a rotation speed of 1000 rpm for 15 seconds, with a solution of 1% by mass of a KBM-503 silane coupling agent (manufactured by Shin-Etsu Chemical Co., Ltd.), 5% by mass of a phthalic acid salt pH 4.01 standard solution, and 94% by mass of isopropyl alcohol mixed and thereafter stirred for 15 minutes. Subsequently, the substrates were heat-dried at 110° C. for 10 minutes to obtain substrates coated with the silane coupling agent. The substrates coated with the silane coupling agent were coated with acrylic monomer compositions, and ultraviolet light curing was performed in the same manner as in Examples 1 to 16 to form polymer film layers on the substrates coated with the silane coupling agent. The results of a cross-cut test (JIS K5400) performed on the polymer film layers are presented in Table 4.

TABLE 4

| | Silane coupling agent | Polymer layer used in light control layer 4 | Cross-cut test |
|---|---|---|---|
| Comparative Example 3 | KBM-503 | MA | 0 |
| Comparative Example 4 | KBM-503 | MB | 0 |

The comparison between Examples 1 to 16 and Comparative Examples reveals that those in which thermally polymerized polymer films were formed had enhanced adhesion.

Examples 20 to 35, Comparative Examples 10 and 11

ITO-deposited glass substrates were spin-coated, at a rotation speed of 1000 rpm for 15 seconds, with 3% by mass solutions of the various acrylic monomers presented in Table 1 in isopropyl alcohol. The substrates were thereafter heated at 230° C. for 30 minutes to thereby subject the acrylic monomers to thermal curing while removing the solvent. The thickness of the cured films, which was measured with a Dektak stylus profiling system (manufactured by Bruker Corporation), was 50 nm to 200 nm. Using a seal dispenser manufactured by Musashi Engineering, Inc., the sides of the substrates on which the cured films were formed were coated with a Struct Bond XN-21-S manufactured by Mitsui Chemicals, Inc. in which a 10 μm-spacer had been mixed. After coating, the sealant was dried at 90° C. for 30 minutes and the substrates were bonded together. After the substrates were bonded together, heating was performed at 150° C. for 90 minutes to thereby produce glass cells.

A material for forming light control that contained 75% by mass of (LA) serving as a liquid crystal composition and 25% by mass of an acrylic monomer composition (MA) was vacuum-injected into the glass cells, and irradiation with ultraviolet light at 40 mW/cm² was performed in a temperature range of 1° C. to 5° C. above the transition point of the material for forming a light control layer for 60 seconds to thereby obtain light-scattering liquid crystal devices in which the resulting layer was capable of being used as a light control layer. By the same method, light-scattering liquid crystal devices presented in Table 5 were obtained.

The voltage-transmittance characteristics of each of the light-scattering liquid crystal devices were measured with an LCD evaluation apparatus (LCD-5200: manufactured by Otsuka Electronics Co., Ltd.). The definitions of the evaluation characteristics are as follows.

T0: It is defined as the light transmittance of the device when no voltage was applied thereto.

T100: It is defined as the light transmittance when no change in light transmittance occurred with the increase in applied voltage.

V90: In the case where the light transmittance of the device when no voltage was applied thereto (T0) is determined to be 0% and in the case where the light transmittance when no change in light transmittance occurred with the increase in applied voltage (T100) is determined to be 100%, the applied voltage (V) corresponding to a light transmittance of 90% is determined to be V90.

Furthermore, the light-scattering liquid crystal devices were subjected to 10 cycles of a thermal cycling test from −20° C. to 60° C., and the presence or absence of cracks in the panels after the test was observed. The presence or absence of cracks is indicated as the number of cracked samples among 10 samples. The results are presented in Table 5.

[Chem. 9]

Liquid crystal composition (LA)

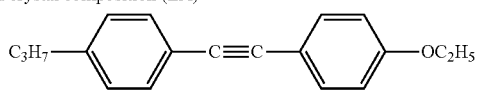

10%

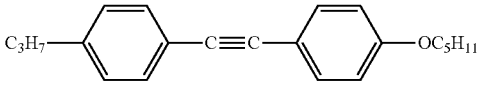

10%

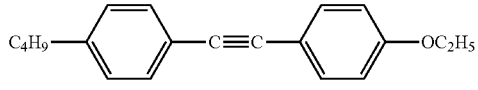

8%

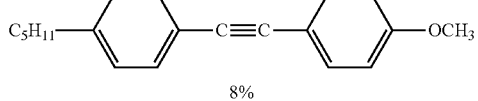

8%

-continued

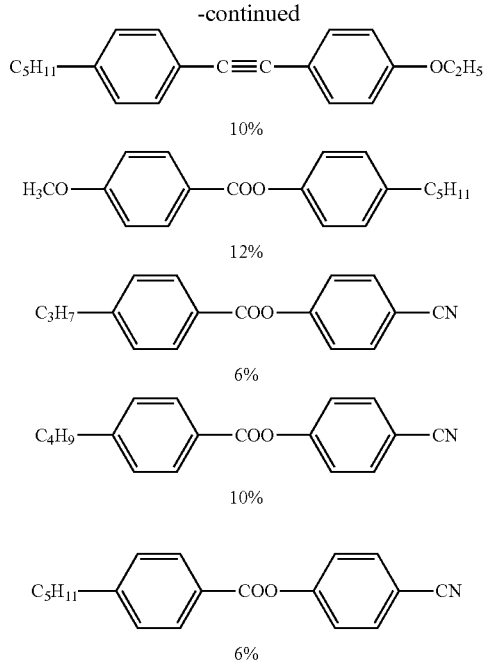

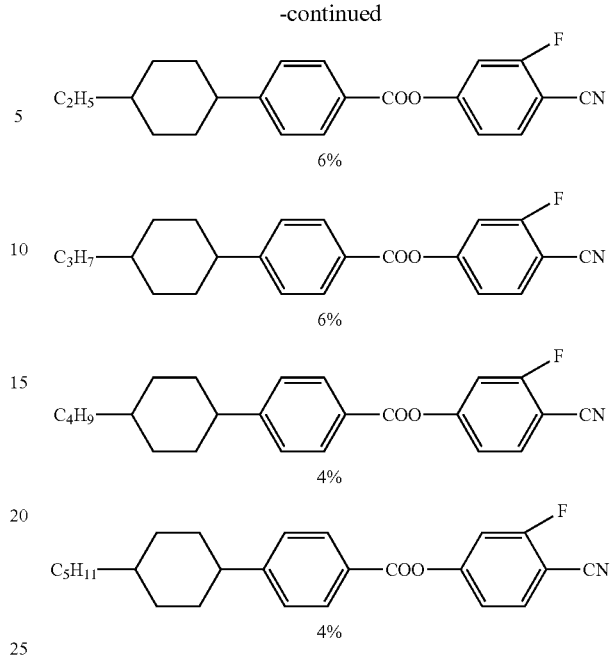

TABLE 5

| Liquid crystal device | Material for polymer layer 3 | Material for forming light control layer 4 | | Voltage-transmittance characteristics | | | Number of cracked samples after thermal cycling |
|---|---|---|---|---|---|---|---|
| | | Liquid crystal composition | Acrylic monomer composition | T0 | T100 | V90 | |
| Comparative Example 10 | D1 | None | LA | MA | 0.3 | 86 | 7.5 | 10 |
| Example 20 | D2 | M1 | LA | MA | 0.3 | 85 | 7.4 | 7 |
| Example 21 | D3 | M2 | LA | MA | 0.3 | 85 | 7.6 | 4 |
| Example 22 | D4 | M3 | LA | MA | 0.3 | 85 | 7.4 | 0 |
| Example 23 | D5 | M4 | LA | MA | 0.3 | 85 | 7.6 | 2 |
| Example 24 | D6 | M5 | LA | MA | 0.3 | 86 | 7.5 | 0 |
| Example 25 | D7 | M6 | LA | MA | 0.3 | 86 | 7.8 | 2 |
| Example 26 | D8 | M7 | LA | MA | 0.3 | 86 | 7.3 | 1 |
| Example 27 | D9 | M8 | LA | MA | 0.3 | 86 | 7.5 | 1 |
| Comparative Example 11 | D10 | None | LA | MB | 0.2 | 87 | 6.5 | 10 |
| Example 28 | D11 | M1 | LA | MB | 0.2 | 87 | 6.4 | 7 |
| Example 29 | D12 | M2 | LA | MB | 0.2 | 87 | 6.5 | 5 |
| Example 30 | D13 | M3 | LA | MB | 0.2 | 87 | 6.7 | 0 |
| Example 31 | D14 | M4 | LA | MB | 0.2 | 87 | 6.8 | 2 |
| Example 32 | D15 | M5 | LA | MB | 0.2 | 87 | 6.3 | 0 |
| Example 33 | D16 | M6 | LA | MB | 0.2 | 86 | 6.2 | 3 |
| Example 34 | D17 | M7 | LA | MB | 0.2 | 87 | 6.5 | 2 |
| Example 35 | D18 | M8 | LA | MB | 0.2 | 85 | 6.4 | 2 |

Comparative Examples 12 and 13

ITO substrates were spin-coated, at a rotation speed of 1000 rpm for 15 seconds, with a solution of 1% of a KBM-503 silane coupling agent (manufactured by Shin-Etsu Chemical Co., Ltd.), 5% of a phthalic acid salt pH 4.01 standard solution, and 94% of isopropyl alcohol mixed and thereafter stirred for 15 minutes. Subsequently, the substrates were heat-dried at 110° C. for 10 minutes. Using the substrates coated with the silane coupling agent, glass cells were produced through the same steps as in Examples 20 to 35, and thereafter light-scattering liquid crystal devices were obtained. After the voltage-transmittance characteristics of each of the obtained light-scattering liquid crystal devices were measured, they were subjected to 10 cycles of a thermal cycling test from −20° C. to 60° C., and the presence or absence of cracks in the panels after the test was observed. The results are presented in Table 6.

neering, Inc., the sides of the substrates on which the cured films were formed were coated with a Struct Bond XN-21-S manufactured by Mitsui Chemicals, Inc. in which a 10 μm-spacer had been mixed. After coating, the sealant was dried at 90° C. for 30 minutes and the substrates were bonded together. After the substrates were bonded together, heating was performed at 150° C. for 90 minutes to thereby produce glass cells.

A material for forming light control that contained 75% by mass of (LA) serving as a liquid crystal composition and 25% by mass of an acrylic monomer composition (MA) was vacuum-injected into the glass cells, and irradiation with ultraviolet light at 40 mW/cm$^2$ was performed in a temperature range of 1° C. to 5° C. above the transition point of the material for forming a light control layer for 60 seconds to thereby obtain light-scattering liquid crystal devices in which the resulting layer was capable of being used as a light control layer. By the same method, light-scattering liquid crystal devices presented in Table 7 were obtained.

TABLE 6

| | Liquid crystal device | Silane coupling agent | Material for forming light control layer 4 | | Voltage-transmittance characteristics | | | Number of cracked samples after thermal cycling |
| --- | --- | --- | --- | --- | --- | --- | --- | --- |
| | | | Liquid crystal composition | Acrylic monomer composition | T0 | T100 | V90 | |
| Comparative Example 12 | D19 | KBM-503 | LA | MA | 0.3 | 85 | 7.7 | 10 |
| Comparative Example 13 | D20 | KBM-503 | LA | MB | 0.2 | 86 | 6.8 | 10 |

The comparison between Examples 20 to 35 and Comparative Examples 10 to 13 reveals that the light-scattering liquid crystal device according to the present invention is less likely to crack after the thermal cycling test.

Examples 40 to 42

ITO-deposited glass substrates were spin-coated, at a rotation speed of 1000 rpm for 15 seconds, with 3% by mass solutions of mixtures in isopropyl alcohol, the mixtures obtained by mixing one of the various acrylic monomers presented in Table 1 and IRGACURE 907 (manufactured by BASF SE) serving as a polymerization initiator in a mass ratio of 97:3. The substrates were thereafter heated at 100° C. for 5 minutes to thereby remove the solvent. These were irradiated for 15 sec with ultraviolet light having an UVA light intensity of 40 mW/cm$^2$ under nitrogen purging to thereby cure thin films. The thickness of the obtained films, which was measured with a Dektak stylus profiling system (manufactured by Bruker Corporation), was 50 nm to 200 nm. Using a seal dispenser manufactured by Musashi Engi-

TABLE 7

| | Liquid crystal device | Material for polymer layer 3 | Material for forming light control layer 4 | | Voltage-transmittance characteristics | | | Number of cracked samples after thermal cycling |
| --- | --- | --- | --- | --- | --- | --- | --- | --- |
| | | | Liquid crystal composition | Acrylic monomer composition | T0 | T100 | V90 | |
| Example 40 | D20 | M3 | LA | MA | 0.3 | 85 | 7.2 | 5 |
| Example 41 | D21 | M5 | LA | MA | 0.3 | 85 | 7.3 | 4 |
| Example 42 | D22 | M8 | LA | MB | 0.2 | 86 | 6.6 | 6 |

REFERENCE SIGNS LIST 1 substrate
2 electrode layer
3 thin film layer (polymer layer)
4 light control layer

The invention claimed is:
1. A light-scattering liquid crystal device comprising:
a first substrate having a first electrode provided thereon;
a second substrate having a second electrode provided thereon, wherein at least one of the first substrate and the second substrate is transparent;

a light control layer between the first electrode and the second electrode, the light control layer containing a liquid crystal material and a polymer substance;

a first thin film layer formed between the first electrode and the light control layer, the light control layer contacting the first thin film layer; and a second thin film layer formed between the second electrode and the light control layer, the light control layer contacting the second thin film layer, wherein each of the first thin film layer and the second thin film layer is formed by subjecting a thermally curable compound containing a reactive group to thermal curing or by subjecting an ionizing radiation-curable compound containing a reactive group to ionizing radiation curing, wherein the polymer substance obtained by polymerizing monomer comprising:

a monofunctional acrylic or methacrylic polymerizable compound represented by General Formula (II-2),

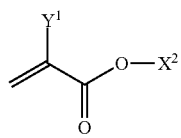

(II-2)

wherein $Y^1$ represents a hydrogen atom or a methyl group and $X^2$ represents an alkyl group having 8 to 30 carbon atoms which can be branched, in which one or two or more non-adjacent —$CH_2$— can each independently be substituted with an oxygen atom, —COO—, or —OCO—; and a bifunctional acrylic or methacrylic polymerizable compound.

2. The light-scattering liquid crystal device according to claim 1, wherein the thin film has a thickness of 10 nm to 1000 nm.

3. The light-scattering liquid crystal device according to claim 1, wherein the reactive group is (P-1) to (P-21):

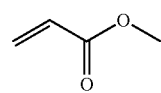

(P-1)

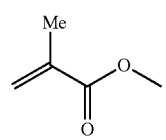

(P-2)

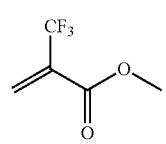

(P-3)

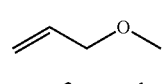

(P-4)

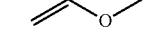

(P-5)

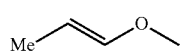

(P-6)

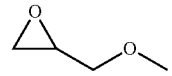

(P-7)

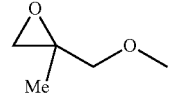

(P-8)

(P-9)

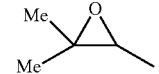

(P-10)

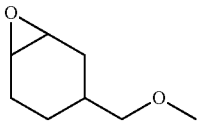

(P-11)

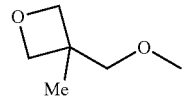

(P-12)

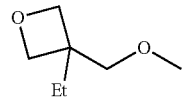

(P-13)

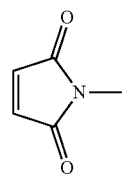

(P-14)

HS—

(P-15)

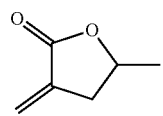

(P-16)

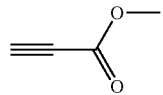

(P-17)

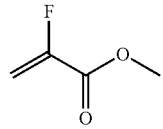

(P-18)

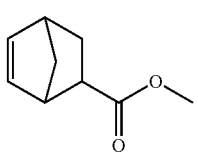

(P-19)

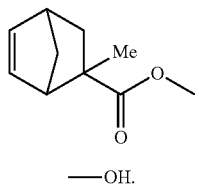 (P-20)
—OH. (P-21)
4. The light-scattering liquid crystal device according to claim 1, wherein the reactive group contains (P-1) or (P-2).
* * * * *